(12) United States Patent
Ghosh et al.

(10) Patent No.: US 7,906,089 B2
(45) Date of Patent: *Mar. 15, 2011

(54) SYSTEMS AND METHODS FOR REMOVING GASEOUS POLLUTANTS FROM A GAS STREAM

(75) Inventors: Rajat Ghosh, Pittsburgh, PA (US); Peter Bowen, St. Catharines (CA); Myra Bowen, legal representative, St. Catharines (CA); Charles Dobbs, Massena, NY (US); Roger Nichols, Plum, PA (US); Neal Dando, Murrysville, PA (US); John R. Smith, Pittsburgh, PA (US); Richard R. Lunt, Lexington, MA (US); Gregory Charles Kraft, Knoxville, TN (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/640,634

(22) Filed: Dec. 17, 2009

(65) Prior Publication Data

US 2010/0175552 A1    Jul. 15, 2010

Related U.S. Application Data

(63) Continuation of application No. 11/868,904, filed on Oct. 8, 2007, now Pat. No. 7,645,430.

(51) Int. Cl.
*B01D 53/50* (2006.01)
*B01D 53/56* (2006.01)
*B01D 53/68* (2006.01)
*B01D 53/78* (2006.01)

(52) U.S. Cl. .......... 423/210; 423/235; 423/240 R; 423/243.01; 422/168

(58) Field of Classification Search .......... 423/210, 423/235, 240 R, 243.01; 422/168
See application file for complete search history.

(56) References Cited

U.S. PATENT DOCUMENTS

| 3,617,212 A | 11/1971 | Shah | 423/522 |
| 3,653,823 A | 4/1972 | Shah | 423/243.09 |

(Continued)

FOREIGN PATENT DOCUMENTS

EP    0613713    9/1994

(Continued)

OTHER PUBLICATIONS

Chang et al., $SO_2$ *Removal by Limestone Dual Alkali*, Environmental Progress, vol. 3, No. 4, pp. 267-274, (1984).

(Continued)

*Primary Examiner* — Timothy C Vanoy
(74) *Attorney, Agent, or Firm* — Greenberg Traurig, LLP

(57) ABSTRACT

Horizontal gas-liquid scrubbing systems and associated gas scrubbing methodologies are provided. In one embodiment, a horizontal duct scrubbing system includes a horizontally disposed housing having a waste gas inlet and a treated gas outlet, a liquid inlet manifold disposed within the horizontally disposed housing, the liquid inlet manifold comprising a plurality of nozzles oriented to spray a scrubbing liquor co-current to the flow of a gas stream flowing through the horizontally disposed housing, and a demister located proximal the treated gas outlet, where the horizontally disposed housing is substantially free of flow deflection members between the liquid inlet manifold and the demister. The gas stream may include sulfur dioxide, and the system may be capable of removing at least 71 vol. % sulfur dioxide from the gas stream.

22 Claims, 15 Drawing Sheets

U.S. PATENT DOCUMENTS

| | | | | |
|---|---|---|---|---|
| 3,948,608 | A | 4/1976 | Weir, Jr. | 422/169 |
| 3,969,482 | A | 7/1976 | Teller | 423/235 |
| 4,049,399 | A | 9/1977 | Teller | 55/73 |
| 4,269,812 | A | 5/1981 | Edwards et al. | 423/243.09 |
| 4,305,737 | A | 12/1981 | Laliwala | 96/259 |
| 4,343,771 | A | 8/1982 | Edwards et al. | 422/168 |
| 4,374,813 | A | 2/1983 | Chen et al. | 423/243.08 |
| 4,462,969 | A | 7/1984 | Wilhelm | 423/242 |
| 4,865,817 | A | 9/1989 | Burgess et al. | 422/168 |
| 4,976,937 | A | 12/1990 | Lee | 423/243.09 |
| 5,266,285 | A | 11/1993 | Glancy et al. | 423/243.09 |
| 5,403,568 | A | 4/1995 | Stowe, Jr. | 423/243.08 |
| 5,486,341 | A | 1/1996 | Bresowar | 423/243.01 |
| 5,662,721 | A | 9/1997 | Bresowar | 55/257 |
| 6,063,352 | A | 5/2000 | Risse et al. | 423/243.06 |
| 6,399,030 | B1 | 6/2002 | Nolan | 422/172 |
| 6,562,304 | B1 | 5/2003 | Mizrahi | 422/171 |
| 6,984,368 | B2 | 1/2006 | Hajjatie et al. | 423/514 |
| 7,645,430 | B2 * | 1/2010 | Ghosh et al. | 423/210 |
| 2002/0110511 | A1 | 8/2002 | Klingspor et al. | 423/243.08 |
| 2004/0079235 | A1 | 4/2004 | Vrotsos | 96/299 |

FOREIGN PATENT DOCUMENTS

| | | |
|---|---|---|
| WO | WO 2006/104304 | 10/2006 |
| WO | WO 2007/096492 | 8/2007 |

OTHER PUBLICATIONS

Lunt et al., *Adaptation of Dilute Mode Lime Dual Alkali Scrubbing at Stillwater Mining Company PGM Smelter*, Hydrometallurgy 2003—Fifth International Conference, vol. 2, pp. 1729-1739, (2003).

Medellin et al., *Removal of $SO_2$ and $NO_x$ from Simulated Flue Gases by Alkalized Alumina in a Radial Flow Fixed Bed*, Ind. Eng. Chem. Process Des. Dev., vol. 17, No. 4, (1978).

International Search Report and Written Opinion from corresponding International Application No. PCT/US2008/076684, mailed Dec. 29, 2008.

Office Action mailed Apr. 15, 2009 from parent U.S. Appl. No. 11/868,904.

Final Office Action mailed Sep. 3, 2009 from parent U.S. Appl. No. 11/868,904.

Notice of Allowability, Examiner's Amendment and Examiner's Reasons for Allowance, mailed Nov. 17, 2009, from parent U.S. Appl. No. 11/868,904.

* cited by examiner 3 x 3 Array - Centers of Equal Areas 3 x 3 Array - Corners of Equal Areas 1 x 3 Array - Corners of Equal Areas

SYSTEMS AND METHODS FOR REMOVING GASEOUS POLLUTANTS FROM A GAS STREAM

CROSS-REFERENCE TO RELATED APPLICATIONS

The present application is a continuation of U.S. patent application Ser. No. 11/868,904, entitled "SYSTEMS AND METHODS FOR REMOVING GASEOUS POLLUTANTS FROM A GAS STREAM", filed Oct. 8, 2007, now U.S. Pat. No. 7,645,430, which is incorporated herein by reference in its entirety. The present application is also related to PCT Patent Application No. PCT/US2008/076684, entitled "SYSTEMS AND METHODS FOR REMOVING GASEOUS POLLUTANTS FROM A GAS STREAM", and filed Sep. 17, 2008.

FIELD OF THE INVENTION

The present invention relates to systems and methods for removing gaseous pollutants, such as sulfur dioxide, from a waste gas stream (e.g., an industrial waste gas) via a horizontal gas-liquid scrubber.

BACKGROUND OF THE INVENTION

Gases containing pollutants, such as sulfur dioxide, are produced in many industrial processes. One method of removing gaseous pollutants from such gases involves the use of vertical scrubbing towers. Such vertical scrubbing towers may be expensive to operate given the capital cost and operating requirements of such towers. Horizontal scrubbers are also known. For example, U.S. Pat. No. 5,403,568 to Stowe, Jr. discloses a horizontal scrubber specifically for control of sulfur dioxide emissions and employs an aqueous scrubbing medium that flows parallel to the gas flow. Stowe, Jr. requires the use of flow deflection members to impede the flow of gases through the scrubber to cause a pressure drop in the scrubber and provide additional gas-liquid contact.

SUMMARY OF THE INVENTION

Broadly, the present invention relates to horizontal gas-liquid scrubbers for removing gaseous pollutants from gases, and systems and methods relating to the same. The scrubbers are generally substantially free of flow deflection members between a liquid inlet manifold and a demister downstream of the liquid inlet manifold. The scrubbers may be able to achieve at least about 71 vol. % sulfur dioxide removal at an L/G ratio of less than 20.

In one aspect, systems for removing sulfur from gases are provided. In one approach, the system is a horizontal duct scrubbing system. In one embodiment, the horizontal duct scrubbing system includes a horizontally disposed housing, a liquid inlet manifold disposed within the horizontally disposed housing, and a demister disposed within the housing, where the horizontally disposed housing is substantially free of flow deflection members between the liquid inlet manifold and the demister. The housing includes a waste gas inlet and a treated gas outlet. The demister may be located proximal the treated gas outlet. The liquid inlet manifold may include a plurality of nozzles oriented to spray a scrubbing liquor co-current to the flow of a gas stream flowing through the horizontally disposed housing. In one embodiment, the liquid inlet manifold includes at least one lance (e.g., a plurality of lances) for supplying scrubbing liquor to the plurality of nozzles, and each of the lances includes at least one nozzle. In one embodiment, the liquid inlet manifold is a first liquid inlet manifold, and the system further includes at least a second liquid inlet manifold disposed within the horizontally disposed housing between the first liquid inlet manifold and the demister, where the second liquid inlet manifold comprises a plurality of nozzles oriented to spray a scrubbing liquor co-current to the flow of the gas stream.

In one embodiment, the horizontal duct scrubbing system is capable of removing at least 71 vol. % sulfur dioxide from an inlet gas. In one embodiment, the horizontal duct scrubbing system is capable of removing at least 80 vol. % sulfur dioxide from the gas stream. In other embodiments, the horizontal duct scrubbing system is capable of removing at least 90 vol. % or even 96 vol. % sulfur dioxide from the gas stream. In one embodiment, the inlet gas comprises not greater than 2000 ppm of $SO_2$. In one embodiment, the system is capable of such sulfur removal rates at an L/G ratio of less than 20. In one embodiment, the horizontal duct scrubbing system achieves such removal rates at an L/G ratio of at least about 5. In one embodiment, the horizontal duct scrubbing system achieves such removal rates at an L/G ratio of not greater than about 18. In one embodiment, the system includes a plurality of liquid inlet manifolds and the horizontal duct scrubbing system operates at an L/G ratio of less than 20 per liquid inlet manifold.

In one embodiment, sulfur dioxide is removed from the gas stream. In other embodiments, the gas stream comprises at least one of NOx, HF, HCl, and $SO_3$, and the system is capable of removing at least some of the NOx, HF, HCl, and $SO_3$ from the gas stream.

In another aspect, methods of removing gaseous pollutants from a gas are provided. In one approach, a method includes the steps of (i) flowing a gas stream comprising gaseous pollutants into a horizontally disposed housing via a waste gas inlet, the horizontally disposed housing comprising the waste gas inlet at one end, a treated gas outlet at an opposite end, a liquid inlet manifold proximal the waste gas inlet and a demister proximal the treated gas outlet, where the horizontally disposed housing is substantially free of flow deflection members between the liquid inlet manifold and the demister, thereby defining a substantially unrestricted gas-liquid contacting zone between the liquid inlet manifold and the demister, (ii) passing the gas stream through the substantially unrestricted gas-liquid contacting zone, (iii) spraying, concomitant to the passing step, a scrubbing liquor through the substantially unrestricted gas-liquid contacting zone and co-current to the flow of the gas stream, thereby contacting the gas stream with the scrubbing liquor, and (iv) removing at least some of the gaseous pollutants from the gas stream during the contacting, where the gaseous pollutants comprise sulfur dioxide, and where after the removing step, at least about 71 vol. % sulfur dioxide is removed from the gas stream. In one embodiment, after the removing step, at least about 80 vol. % sulfur dioxide is removed from the gas stream. In other embodiments, after the removing step, at least about 90 vol. %, or even 96 vol. % of sulfur dioxide is removed from the gas stream.

In one embodiment, the sulfur dioxide concentration of the gas stream prior to the passing step is not greater than 2000 ppm. In one embodiment, a method includes operating the scrubbing system at an L/G ratio of less than 20 (e.g., during the flowing, passing, spraying and/or removing steps). In one embodiment, the L/G ratio is at least about 5. In one embodiment, the L/G ratio is not greater than about 18. In one embodiment, during the passing step the gas stream has a speed of at least about 12 feet per second. In one embodiment, during the passing step the gas stream has a speed of not greater than about 45 feet per second. In one embodiment, the pressure drop of the gas stream between the waste gas inlet and the treated gas outlet is not greater than 6 inches of water.

In one embodiment, sulfur dioxide is removed during the removing step. In other embodiments, one or more of NOx, HF, HCl, and $SO_3$ are included in the gas stream, and the removing step comprises removing at least some of the NOx, HF, HCl, and $SO_3$ from the gas stream.

These and other aspects, advantages, and novel features of the invention are set forth in part in the description that follows and will become apparent to those skilled in the art upon examination of the following description and figures, or may be learned by practicing the invention.

DETAILED DESCRIPTION OF THE INVENTION

Figure 1:
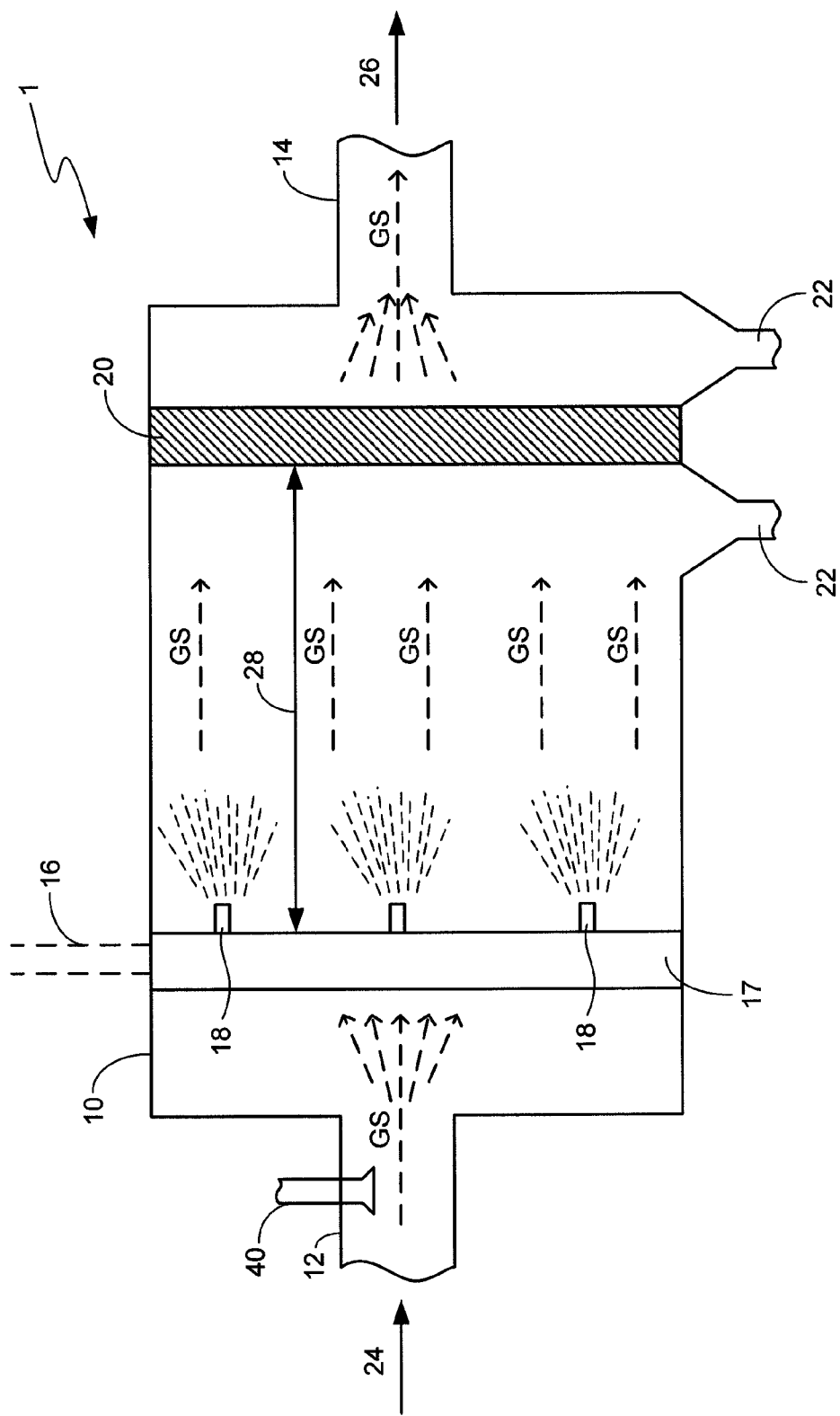
FIG. 1 is a schematic view of one embodiment of a horizontal gas-liquid scrubbing system.
Figure 2:
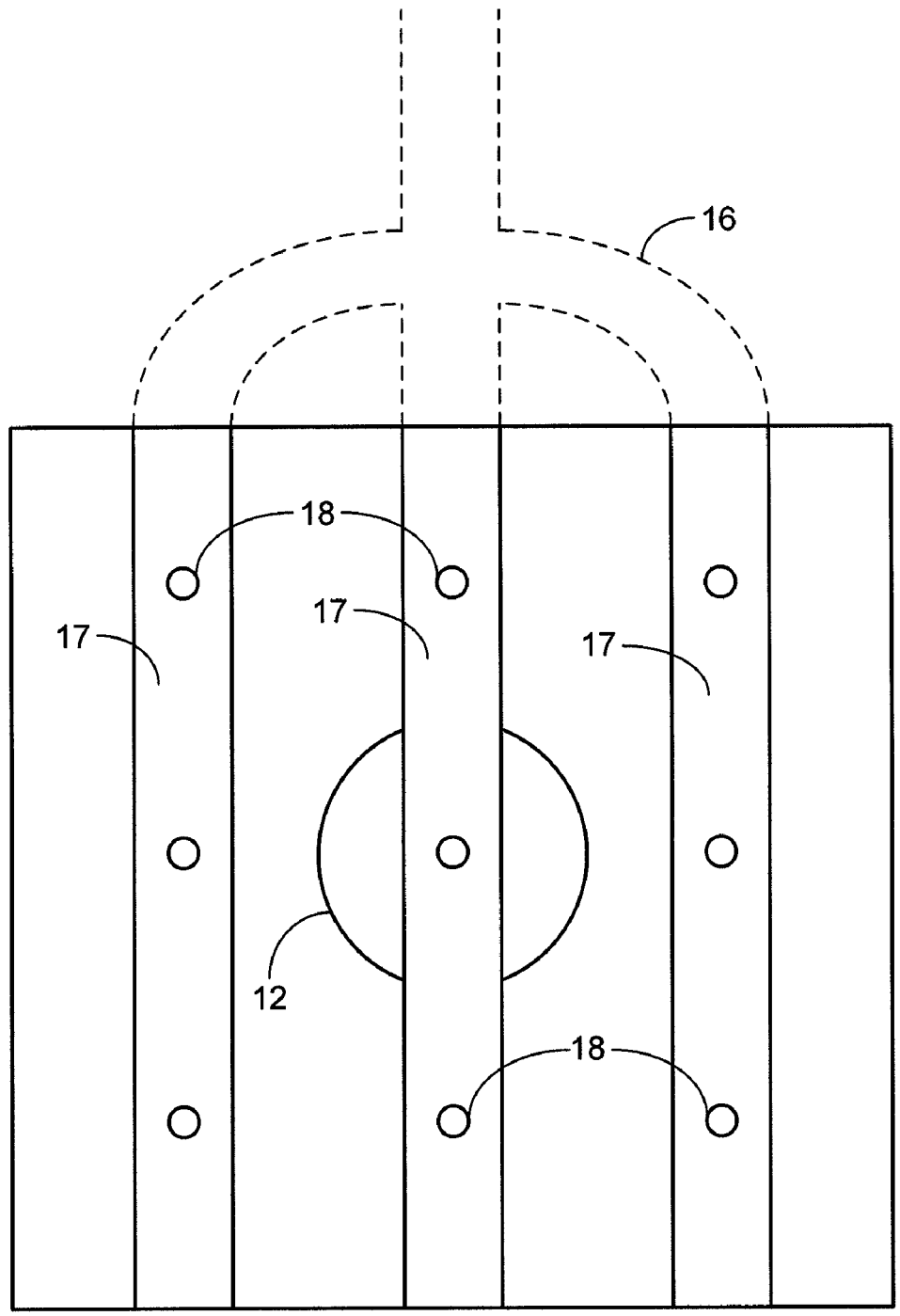
FIG. 2 is a partial cut-away view of the horizontal gas-liquid scrubbing system of FIG. 1 as viewed looking down the housing toward the gas inlet.

Reference will now be made in detail to the accompanying drawings, which at least assist in illustrating various pertinent embodiments of the present invention. Referring now to FIGS. 1 and 2, one embodiment of a horizontal gas-liquid scrubbing system is illustrated. In the illustrated embodiment, the horizontal gas-liquid scrubbing system 1 includes a horizontally disposed housing 10 comprising a waste gas inlet 12 for receiving a waste gas stream 24, and a treated gas outlet 14 for discharging a treated gas stream 26. In the illustrated embodiment, a gas stream GS flows from the waste gas inlet 12, through the horizontally disposed housing 10, and exits via the treated gas outlet 14. The horizontally disposed housing 10 further comprises a liquid inlet manifold 16 downstream of the waste gas inlet 12. The liquid inlet manifold 16 comprises at least one inlet lance 17, each inlet lance 17 being at least partially hollow to facilitate liquid flow therethrough. Each inlet lance has at least one nozzle 18 coupled thereto, and sometimes a plurality of nozzles 18 ("nozzle(s)") coupled thereto. The plurality of nozzle(s) 18 are oriented within the horizontally disposed housing 10 so as to facilitate spraying of a scrubbing mist co-current to the flow of the gas stream GS. In this regard, the nozzle(s) 18 are fluidly interconnected to a scrubbing liquor supply (not illustrated) via the inlet lances 17 of the liquid inlet manifold 16. The horizontally disposed housing 10 further includes a demister 20 downstream of the liquid inlet manifold 16. The demister 20 is adapted to remove entrained liquid droplets from the gas stream GS before the gas stream GS exits the horizontally disposed housing 10 as treated gas stream 26 via the treated gas outlet 14. The removed liquid exits the horizontally disposed housing 10 via liquid outlets 22.

The horizontally disposed housing 10 is substantially free of flow deflection members between the liquid inlet manifold 16 and the demister 20, thereby defining a substantially unrestricted gas-liquid contacting zone 28. The present inventors have found that, even in the absence of flow defection members in the gas-liquid contacting zone 28, substantial removal of gaseous pollutants in the gas stream GS may be facilitated and with a relatively small footprint. As used herein, "gaseous pollutants" means any undesirable gaseous species contained in the GS. In one embodiment, the gaseous pollutants are acidic as compared to the scrubbing liquor. In one embodiment, the gaseous pollutants comprise sulfur species, such as sulfur dioxide and sulfur trioxide. In one embodiment, the gaseous pollutants comprise one or more of NOx (e.g., NO, $NO_2$) and halogenated hydrogen compounds (e.g., HF, HCl). In one embodiment, the gaseous pollutants comprise volatile organic compounds ("VOCs)", such as hydrocarbons, aldehydes and keytones, to name a few.

In one embodiment, the inlet gas stream comprises $SO_2$. In this embodiment, the system 1 may be capable of removing at least about 65 vol. % $SO_2$ from the gas stream GS. In other embodiments, the system 1 may be capable of removing as at least about 70 vol. % $SO_2$ from the gas stream GS (e.g., at least about 71 vol. % $SO_2$), such as at least about 75 vol. % SO2, or even at least about 80 vol. % $SO_2$, or even at least about 85 vol. % $SO_2$, or even at least about 90 vol. % $SO_2$, or even at least about 95 vol. % $SO_2$ (e.g., at least about 96 vol. % $SO_2$).

The $SO_2$ removal rates may be achieved over a relatively large range of $SO_2$ inlet concentrations. In one embodiment, the inlet concentration of $SO_2$ in the gas stream GS is not greater than 2000 ppm of $SO_2$. In other embodiments, the SO2 concentration is not greater than about 1500 ppm, such as not greater than about 1000 ppm, or even not greater than about 500 ppm, or even not greater than about 200 ppm, or even not greater than about 100 ppm, or even not greater than about 80 ppm, or even not greater than about 50 ppm, or even not greater than about 35 ppm.

The above $SO_2$ removal rates may be achieved with relatively small L/G ratios. As used herein, L/G means the average gallons per minute of scrubbing liquor flow ("L") into the liquid inlet manifold 16, as measured proximal the inlet to the liquid inlet manifold 16, per 1000 actual cubic feet per minute (ACFM) of water saturated gas stream flow of the gas stream ("G"). "G" may be measured directly or may be calculated, for example, by measuring the total flow rate of the gas stream proximal the waste gas inlet 12 and adjusting for evaporation of water and temperature reduction. In one embodiment, the L/G ratio is less than 20. In other embodiments, the L/G ratio is not greater than about 18, or even not greater than about 14, or even not greater than about 12. Generally, the L/G ratio is at least about 5. In some embodiments, the L/G ratio is at least about 8, or even at least about 10.

As noted, the nozzle(s) 18 are fluidly interconnected within the liquid inlet manifold 16. The nozzle(s) 18 are operable to inject scrubbing liquor into the housing 10 to produce a scrubbing mist that flows co-current to the gas stream GS. Thus, the nozzle(s) 18 are generally configured with their ejection end disposed towards the demister 20. The nozzle(s) 18 are generally operable to produce the scrubbing mist from the scrubbing liquor. The nozzle(s) 18 may be adapted to spray the scrubbing liquor in any suitable spray pattern to form the scrubbing mist within the housing. It is generally desirable for the nozzle(s) 18 to produce a scrubbing mist that substantially covers a cross-sectional area of the horizontally disposed housing 10. Thus, the nozzle(s) 18 may employ a full cone spray pattern, a hollow cone spray pattern, a flat spray pattern, or any combination thereof.

The relative distance between the each of the nozzle(s) 18 may be tailored so that the scrubbing mist from one nozzle overlaps with the scrubbing mist of one or more adjacent nozzle(s) 18. Hence, the scrubbing mist may substantially cover the cross-sectional area of the horizontally disposed housing 10. The momentum of the scrubbing mist exiting the nozzles may be tailored so that appreciable amounts of the scrubbing mist remain airborne across a substantial length of the gas-liquid contacting zone 28. Thus, appreciable amounts of the scrubbing mist may substantially cover the cross-sectional area of the horizontally disposed housing 10 and over a substantial length of the gas-liquid contacting zone 28, thereby providing intimate contact between the gas stream GS and the scrubbing mist in the substantially unrestricted gas-liquid contacting zone 28. Such intimate contact may facilitate reaction of gaseous pollutants in the gas stream GS with scrubbing agents in the scrubbing mist. In turn, high gaseous pollutant removal rates may be realized.

Any number of nozzle(s) 18 with any number of spray patterns and/or droplet sizes and in any combination may be utilized with the liquid inlet manifold 16 to facilitate operation of the horizontal gas-liquid scrubbing system 1. By way of primary illustration, the nozzle(s) 18 may all comprise the same scrubbing mist generation capability (e.g., the same spray pattern capability, momentum production capability, and/or droplet size capability). By way of secondary illustration, a first set of nozzle(s) may comprise a first mist generation capability (e.g., a first spray pattern, a first momentum production capability and/or a first droplet size capability), and a second set of nozzle(s) may comprise a second mist generation capability (e.g., a second spray pattern, a second momentum production capability and/or a second droplet size range). In turn, other additional nozzle sets (e.g., third, fourth, etc.) may be utilized. Furthermore, any number of nozzles may be utilized per lance 17 of the liquid inlet manifold 16. In the illustrated embodiment, three nozzles 18 per lance 17 of the liquid inlet manifold 16 are utilized. However, other configurations may also be utilized. Furthermore, adjacent nozzle(s) 18 may be similarly oriented in the up, down and/or side-to-side directions (e.g., sharing the same vertical and/or horizontal plane), as illustrated, or adjacent nozzle(s) 18 may be offset relative to one or more other nozzle(s) 18.

In one embodiment, the nozzles are spiral jet nozzles. The spiral jet nozzles may be full cone or hollow cone nozzles. The spiral jet nozzles may have a 60-degree or 90-degree spray angle. The spiral jet nozzles may eject liquid at a pressure in the range of from about 40 psig to about 65 psig. The spiral jet nozzles may have a liquid flow capacity in the range of from about 15 gpm to about 50 gpm. The spiral jet nozzles may be constructed from durable materials so as to increase, usage lifetime. In this regard, ceramics or other wear resistant materials, such as stainless steel or silicon carbide, may be used to construct the nozzles.

In general, the nozzle(s) 18 should be arranged to lower or restrict the amount of scrubbing mist that contacts the walls of the housing 10. In this regard, the housing 10 should generally be sized to lower or restrict the amount of scrubbing mist contacting its walls. In any event, the cross-sectional area should not be so large that the pressure drop across the housing 10 is not excessive.

The substantially unrestricted gas-liquid contacting zone 28 may facilitate low pressure drop across the horizontally disposed housing 10. Pressure drop is a function of many variables, but it is anticipated that, in some embodiments, the pressure drop across the housing 10 may be not greater than 8 inches of $H_2O$. In one embodiment, the pressure drop is not greater than 6 inches of $H_2O$. In other embodiments, the pressure drop across the housing is not greater than 4 inches of water, or even not greater than 2 inches of $H_2O$, or even not greater than 1.5 inches of $H_2O$, as measured at gas stream GS flow rates of between about 12 feet per second and 45 feet per second.

As noted, the horizontally disposed housing 10 is substantially free of flow deflection members between the liquid inlet manifold 16 and demister 20, which defines a substantially unrestricted gas-liquid contacting zone 28. The length of the gas-liquid contacting zone 28 is application dependent, and may be a function of, for example, the flow rate of the gas stream GS through the housing, the inlet sulfur concentration, the cross-sectional area of the housing, and/or the concentration/alkalinity of the scrubbing liquor, to name a few. Generally, the length of the gas-liquid contacting zone 28 should be long enough to facilitate sufficient interaction between the gas stream GS and the scrubbing liquor so that suitable $SO_2$ removal rates are facilitated (e.g., at least about 90 vol. % $SO_2$), but with restricted pressure drop.

The demister 20 may be any suitable liquid removal apparatus capable of removing liquids from the gas stream GS within the applicable speed flow rates ranges. One particularly useful demister 20 for gas streams having a speed in the range of about 12 to about 27 feet per second is a 2-pass chevron-type mist reducer/eliminator.

The inlet gas stream GS may have a velocity suited to facilitate removal of sulfur species during its residence time within the scrubbing system 1. In one embodiment, the gas stream has a bulk gas velocity (average across the housing) in the range of from about 10 feet per second (fps) to about 45 fps. In one embodiment, the gas stream has a bulk gas velocity in the range of from about 22 fps to about 27 fps. Gas stream velocities of 27 fps or less may be compatible with a 2-pass chevron-type mist eliminator. Other type demisters may be used when the gas stream has higher bulk gas velocities, or expansion zones may be used to lower the gas stream bulk velocity, as described below.

In the illustrated embodiment, the housing 10 has a generally equal cross-sectional area. However, in other embodiments (not illustrated) the housing 10 may have varying cross-sectional areas. For example, a first portion of the housing 10 may have a first cross-sectional area and a second portion of the housing 10 may have a second cross-sectional area that is different than the first cross-sectional area. In one embodiment, the second cross-sectional area may be larger than the first cross-sectional area. In this embodiment, the second cross-sectional area may be considered an expansion zone, which may reduce the gas velocity. In one approach (not illustrated), an expansion zone is included within the housing to facilitate reduction of the inlet gas from a first gas flow rate (e.g., greater than about 27 fps) to a second gas flow rate (e.g., not greater than about 27 fps). Thus, in some instances, the inlet velocity of the gas stream GS may be higher than the velocity of the gas stream proximal the demister. In some instances, the velocity of the gas stream may be as high as about 45 fps and the expansion zone may be provided within the housing to facilitate reduction of the gas stream velocity prior to its contacting the demister. In other embodiments, bulk velocity of the gas stream is in excess of 27 fps and no expansion zone is utilized, but a compatible demister is used.

The scrubbing liquor may be any liquid adapted to produce a scrubbing mist via the nozzle(s) 18 and to remove sulfur species from the waste gas stream 24 via interaction therewith (e.g., via reaction/absorption/entrainment). The misted scrubbing liquor may be capable of removing any of the above-described gaseous pollutants prior to the gas stream GS exiting the horizontally disposed housing 10 as treated gas stream 26, such as any of the above-described sulfur dioxide removal rates. The misted scrubbing liquor should be capable of removing such gaseous pollutants at relatively low L/G ratios, such as any of the above described L/G ratios. In one embodiment, the scrubbing liquor is an alkali feed liquid, such as a sodium-based liquid and may comprise, for example, sodium sulfite. In one embodiment, caustic and/or soda ash is used to produce the sodium sulfite of the scrubbing liquor. In other embodiments, the scrubbing liquor may comprise other alkali liquids, such as one or more of seawater, lime-enhanced seawater, magnesium-promoted lime, and sodium-promoted lime, to name a few. Thus, in some embodiments, the horizontal gas-liquid scrubbing system may be integrated with existing water containing/treatment systems to produce the scrubbing liquor and/or regenerate spent scrubbing liquor.

In one embodiment, the scrubbing liquor is sodium-based and is regenerable via a dilute mode dual alkali methodology or a concentrated mode dual alkali methodology, where a first reagent (e.g., sodium sulfite species) is utilized to remove sulfur dioxides from the waste gas stream 24. In turn, a second reagent (e.g., slaked lime) is utilized to regenerate waste liquids for use as the scrubbing liquor.

For a once-through system, the scrubbing liquor may have an alkalinity that facilitates removal of sulfur dioxides from the waste gas stream 24. The alkalinity of the scrubbing liquor varies by application and is generally related to the inlet $SO_2$ and $CO_2$ concentration. In one embodiment, such as for waste gas streams comprising not greater than 80 ppm of $SO_2$, the alkalinity of the scrubbing liquor may be at least about 300 ppm as $CaCO_3$, but not greater than about 500 ppm as $CaCO_3$. In another embodiment, such as for waste gas streams comprising an inlet concentration of not greater than 200 ppm $SO_2$, the alkalinity of the scrubbing liquor may be at least about 750 ppm as $CaCO_3$, but not greater than about 1200 ppm as $CaCO_3$. Similarly, the pH of the scrubbing liquor may be tailored relative to the inlet sulfur concentration. Alkalinity and pH may be adjusted, as is known in the art, for use with waste gas streams employing greater than 200 ppm $SO_2$.

Figure 3:
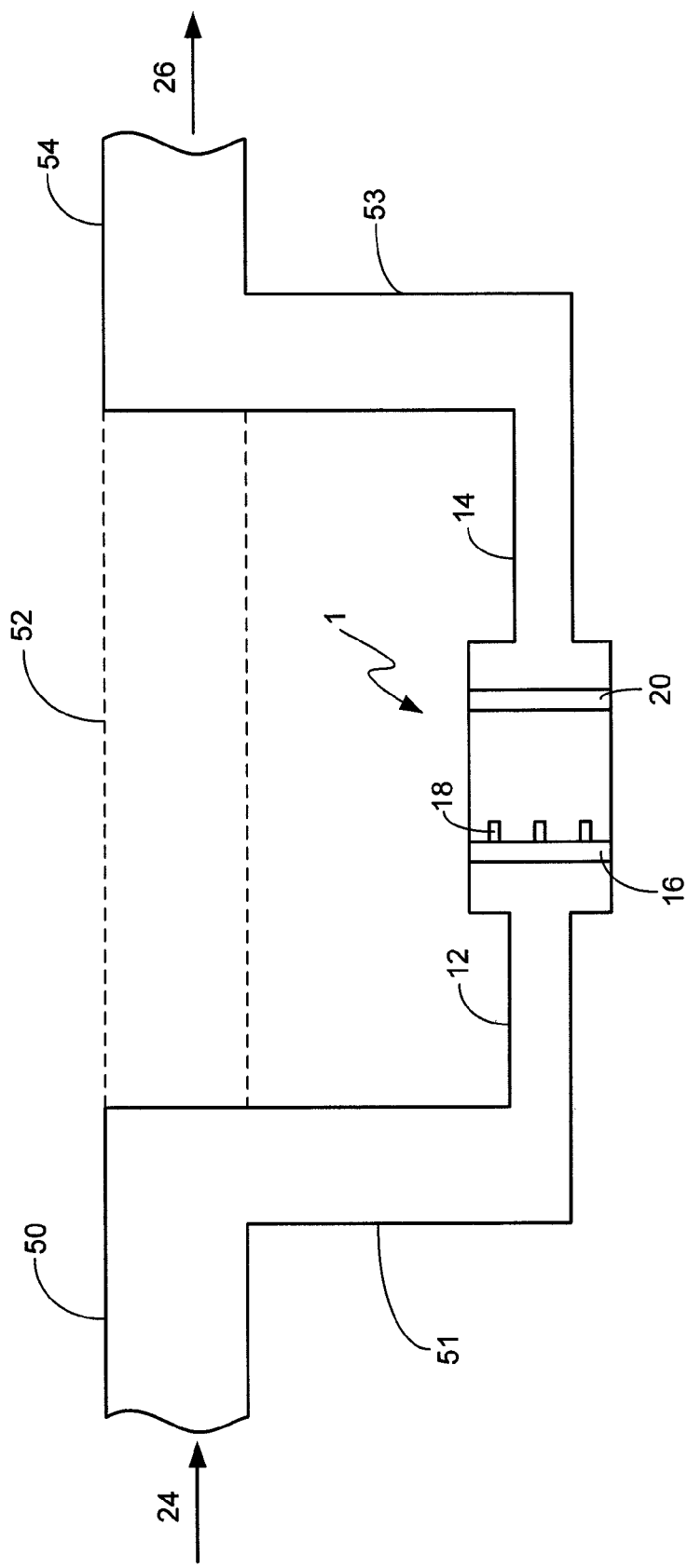
FIG. 3 is a schematic illustration of one embodiment of an in-duct horizontal gas-liquid scrubbing system.

The horizontal gas-liquid scrubbing system 1 may be utilized in a variety of applications. In one embodiment, the horizontal gas-liquid scrubbing system 1 is employed in an in-duct setting, where the waste gas inlet 12 and treated gas outlet are directly interconnected to a waste gas duct of an industrial facility. One embodiment of such a configuration is illustrated in FIG. 3. In the illustrated embodiment, waste gas 24 from an industrial facility (not illustrated) exits such industrial facility via ductwork 50. The horizontal gas-liquid scrubbing system 1 is fluidly interconnected to the ductwork 50 via piping 51 and gas inlet 12. As described above, such waste gas 24 may be treated via the horizontal gas-liquid scrubbing system 1, and treated gas 26 may be exhausted via the treated gas outlet 14. In this regard, the system 1 may include one or more transition zones (described above) to obtain suitable gas stream flow rates and/or may include suitable demisters. In turn, the treated gas outlet 14 may be fluidly interconnected with exhaust ductwork 54 via piping 53. Such treated gas 26 may be exhausted to the atmosphere. Hence, in one embodiment, ductwork 50 and exhaust ductwork 54 are preexisting prior to installation of the horizontal gas-liquid scrubbing system 1, and a channel 52 interconnecting ductwork 50 and exhaust ductwork 54 may be removed to facilitate incorporation of the horizontal gas-liquid scrubbing system 1. Thus, in some embodiments, the horizontal gas-liquid scrubbing system 1 may be added to existing facilities with relatively minor adjustments to existing waste gas treatment systems. In other embodiments, the horizontal gas-liquid scrubbing system is used in non-retrofit applications, such as newly constructed gas scrubbers.

The waste gas stream 24 may be any waste gas stream requiring removal of gaseous pollutants therefrom. For example, the waste gas stream may be a waste gas from an aluminum smelting facility, industrial steam boilers, or a steel manufacturing facility, to name a few. In one approach, the waste gas stream may be a concentrated waste gas stream from an aluminum smelting facility, such as a concentrated waste gas stream from a dry scrubbing concentration operation, such as by that disclosed in PCT Application No. PCT/FR2006/000415, the contents of which are incorporated herein by reference in its entirety.

In one embodiment, the waste gas stream comprises a concentration of not greater than about 2000 ppm $SO_2$, on average. In a particular embodiment, the waste gas stream comprises not greater than about 200 ppm $SO_2$, on average (e.g., a waste gas from an aluminum smelting facility), and the scrubbing liquor comprises soda ash. In another embodiment, the waste gas stream comprises not greater than 2000 ppm $SO_2$, on average, and a dilute mode dual alkali, a concentrated mode dual alkali, a sodium-promoted lime, or a magnesium-promoted lime scrubbing methodology may be utilized.

The temperature and humidity of the incoming waste gas stream 24 may affect the performance of the system 1. In one embodiment, a cooling water spray upstream of the liquid inlet manifold 16 is used to at least partially humidify and/or cool the incoming waste gas stream, sometimes referred to herein as pre-humidification. For example, and with reference to FIG. 1, the horizontal gas-liquid scrubbing system 1 may optionally comprise a cooling spray 40 disposed upstream of the liquid inlet manifold 16 for spraying water (or other suitable cooling medium) into the entering waste gas stream 24 for cooling such waste gas stream 24. The cooling spray 40 may spray cooling water in a countercurrent or co-current fashion relative to the waste gas stream 24 to facilitate such cooling. The volumetric flow rate of such cooling liquid spray is generally application dependent. The use of pre-humidification may result in at least about a 2 vol. % increase in SO$_2$ removal, or even at least about a 3% vol. increase, or even about a 4 vol. % increase. In some embodiments, using pre-humidification may allow the system 1 to operate at lower L/G ratios while still achieving suitable SO$_2$ removal rates.

As noted above, the system may remove gaseous pollutants other than SO$_2$ from a waste gas stream. For example, the system may remove one or more of NOx, HCl, HF, SO$_3$, and VOCs, to name a few. Various scrubbing liquors may be employed in this regard. In any event, the scrubbing liquor may have a basic pH relative to the gaseous pollutants (except the VOCs) so as to facilitate their removal.

EXAMPLES

Example 1

Evaluation of SO$_2$ Removal with and without Flow Deflection Members

A horizontal gas-liquid scrubbing system similar to the one illustrated in FIG. 1 is produced in two configurations. The first configuration includes a 50% open contactor between the nozzles and the demister. The second configuration is free of flow deflection members between the nozzles and the demister. The demister is a 2-pass chevron-type mist eliminator. Waste gas having an average SO$_2$ concentration of about 80 ppm is provided to the system at a volumetric flow rate of between about 3,500 and 5,000 ACFM, with an average velocity of about 22 feet per second. Various nozzles types, including whirljet-type, also known as W-type nozzles, and sprayjet-type, also known as BSL-type or pigtail nozzles, having a 90° spray angle and a hollow cone spray are utilized during the testing. A scrubbing liquor supply tank comprising sodium sulfite and sodium carbonate is supplied to the nozzles at an L/G ratio in the range of from about 15 to about 18.

Figure 4:
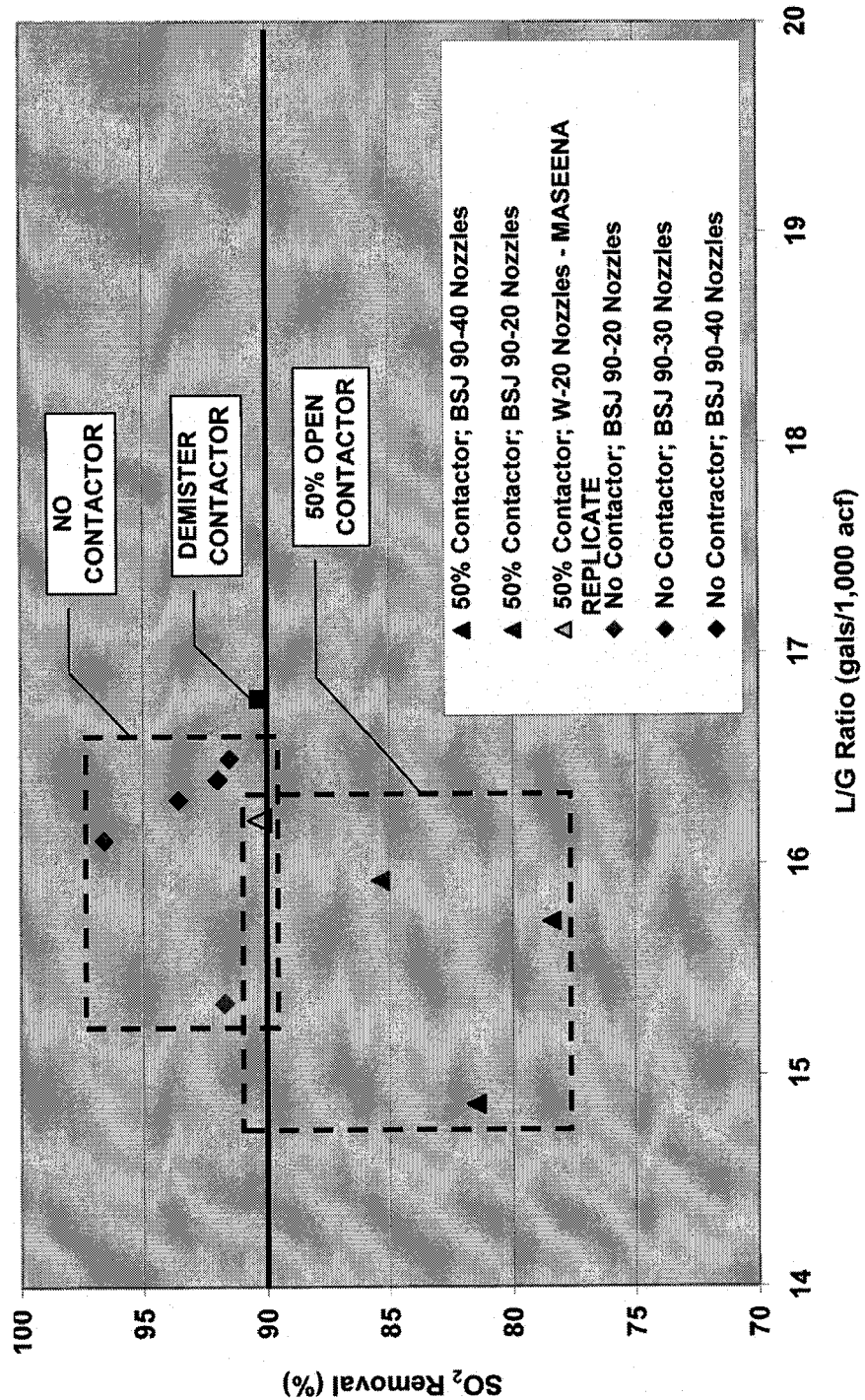
FIG. 4 is a graph illustrating sulfur dioxide removal as a function of liquid-to-gas flow rate ratios for a horizontal gas-liquid scrubbing system utilizing a 50% contactor as compared to a horizontal gas-liquid scrubbing system that is free from flow deflection members therein.
Figure 5:
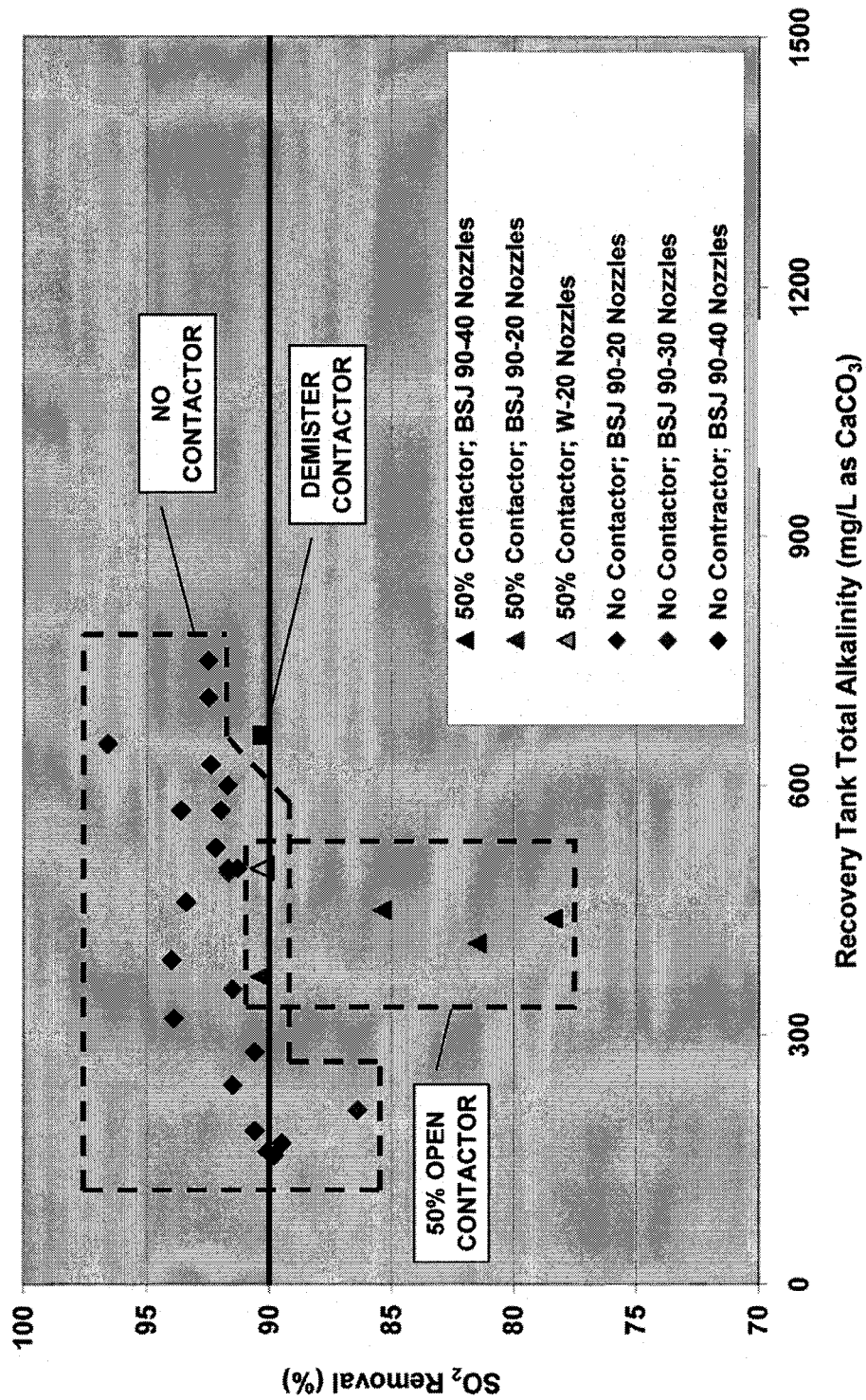
FIG. 5 is a graph illustrating sulfur dioxide removal as a function of alkalinity for a horizontal gas-liquid scrubbing system utilizing a 50% contactor as compared to a horizontal gas-liquid scrubbing system that is free from flow deflection members therein.

FIG. 4 illustrates the effect of SO$_2$ removal efficiency relative to L/G ratio utilizing both the first configuration (50% contactor) and the second configuration (no flow deflection members). FIG. 5 illustrates the effect of SO$_2$ removal efficiency relative to alkalinity in both the first configuration (50% contactor) and the second configuration (no flow deflection members). Higher average SO$_2$ removal rates are realized in the second configuration with no flow deflection members between the nozzles and demister.

Example 2

Evaluation of Distance Between Nozzles and Demister

Figure 6:
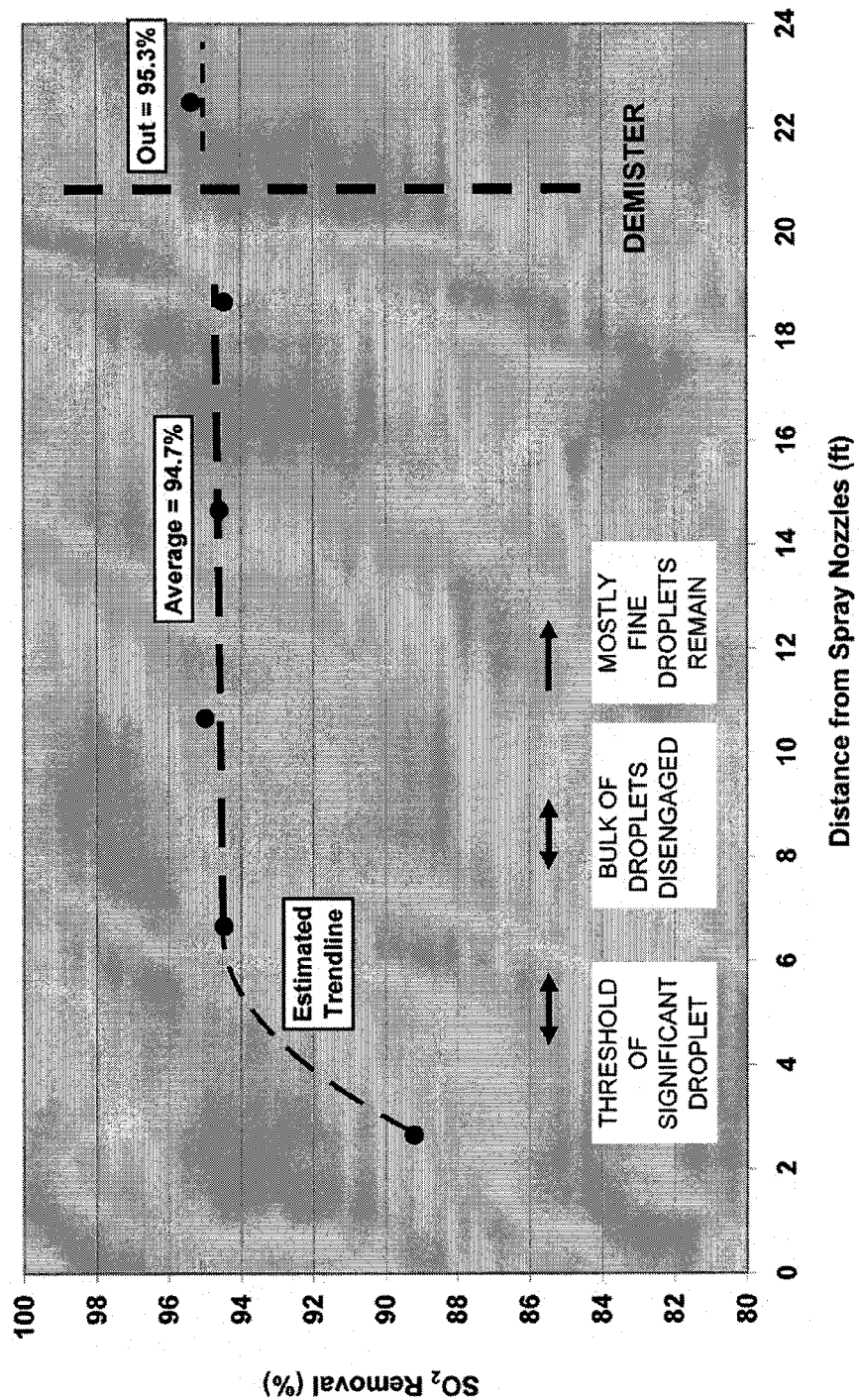
FIG. 6 is a graph illustrating sulfur dioxide removal as a function of distance between nozzles and a demister.

A horizontal gas-liquid scrubbing system similar to the one illustrated in FIG. 1 is produced. Waste gas having an average SO$_2$ concentration of about 77 ppm and a flow rate of about 23 feet per second is provided to the system. The L/G ratio is about 16. The demister is a 2-pass chevron-type mist eliminator and is located about 20 feet downstream of the nozzles. The SO$_2$ concentration in the gas is measured between the nozzles and the demister, the results of which are illustrated in FIG. 6. SO$_2$ removal efficiency increases dramatically at distances from 0 feet to 8 feet between the demister and the nozzles, and levels out thereafter.

Example 3

Evaluation of Housing Size and Number of Nozzles

Figure 7:
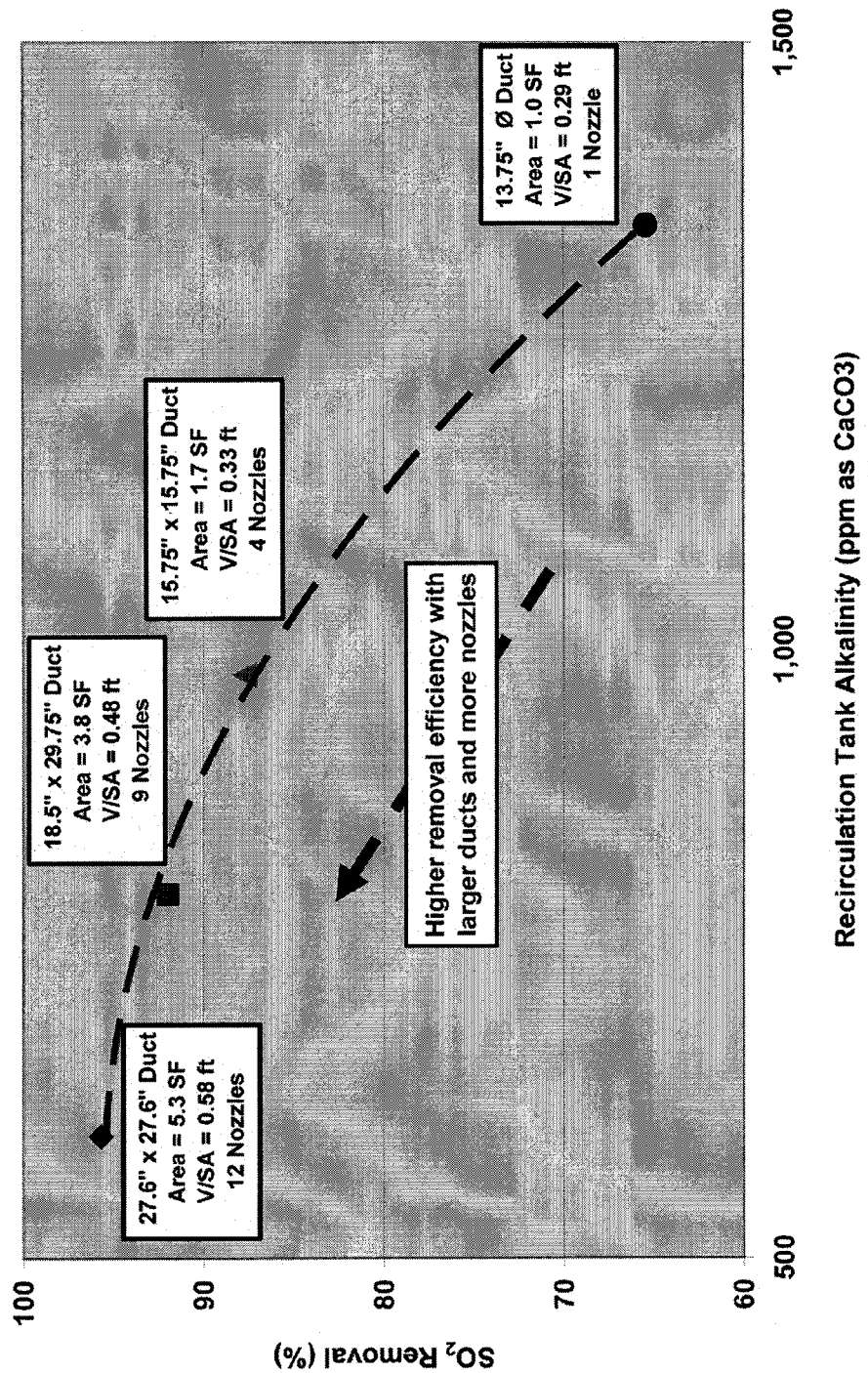
FIG. 7 is a graph illustrating sulfur dioxide removal as a function of alkalinity for a variety of housing sizes.

Various horizontal gas-liquid scrubbing systems similar to the one illustrated in FIG. 1 are produced. The size of the housing and the amount of nozzles within the housing are varied. An inlet gas having about between about 100 ppm and 200 ppm SO$_2$ and a velocity of about 22 fps is used. A sodium-based scrubbing liquor having an alkalinity in the range of from about 600 ppm as CaCO$_3$ to about 1400 ppm as CaCO$_3$ is used. The system is operated at an L/G ratio of about 17. As illustrated in FIG. 7, over 90 vol. % SO$_2$ removal is achieved in systems having a larger cross-sectional area and more spray nozzles at moderate alkalinity values (600-800 ppm) as CaCO$_3$, while 90 vol. % SO$_2$ removal is not achieved in smaller housings with fewer nozzles, even at alkalinity values of 1000 ppm as CaCO$_3$ and higher. It is postulated that smaller housings have greater "edge effects" in that a greater percentage of the mist impinges on the walls of the housing, thereby reducing the effective amount of mist available for interaction with the waste gas stream.

Example 4

Evaluation of Nozzle Array Configuration

Figure 8A:
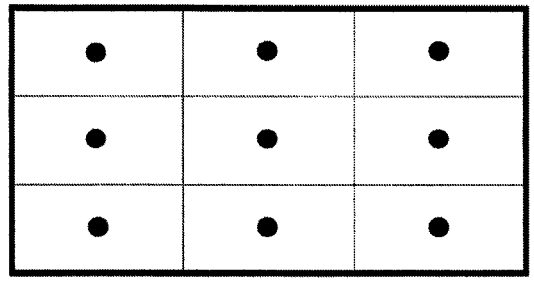
FIGS. 8a-8c are schematic illustrations of embodiments of nozzle placement configurations.
Figure 8B:
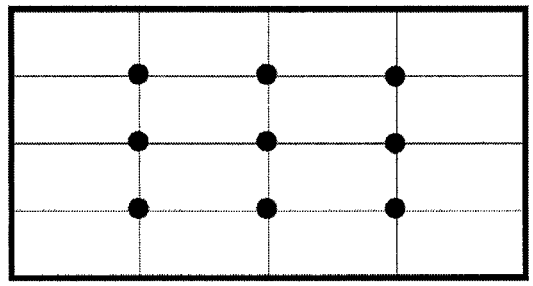
Figure 8C:
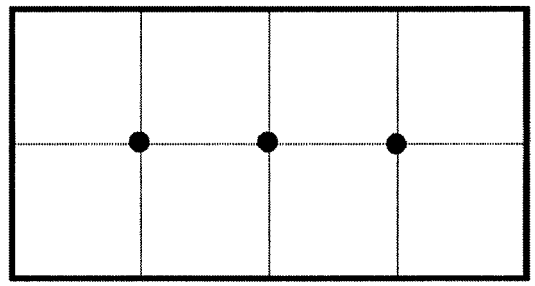
Figure 9A:
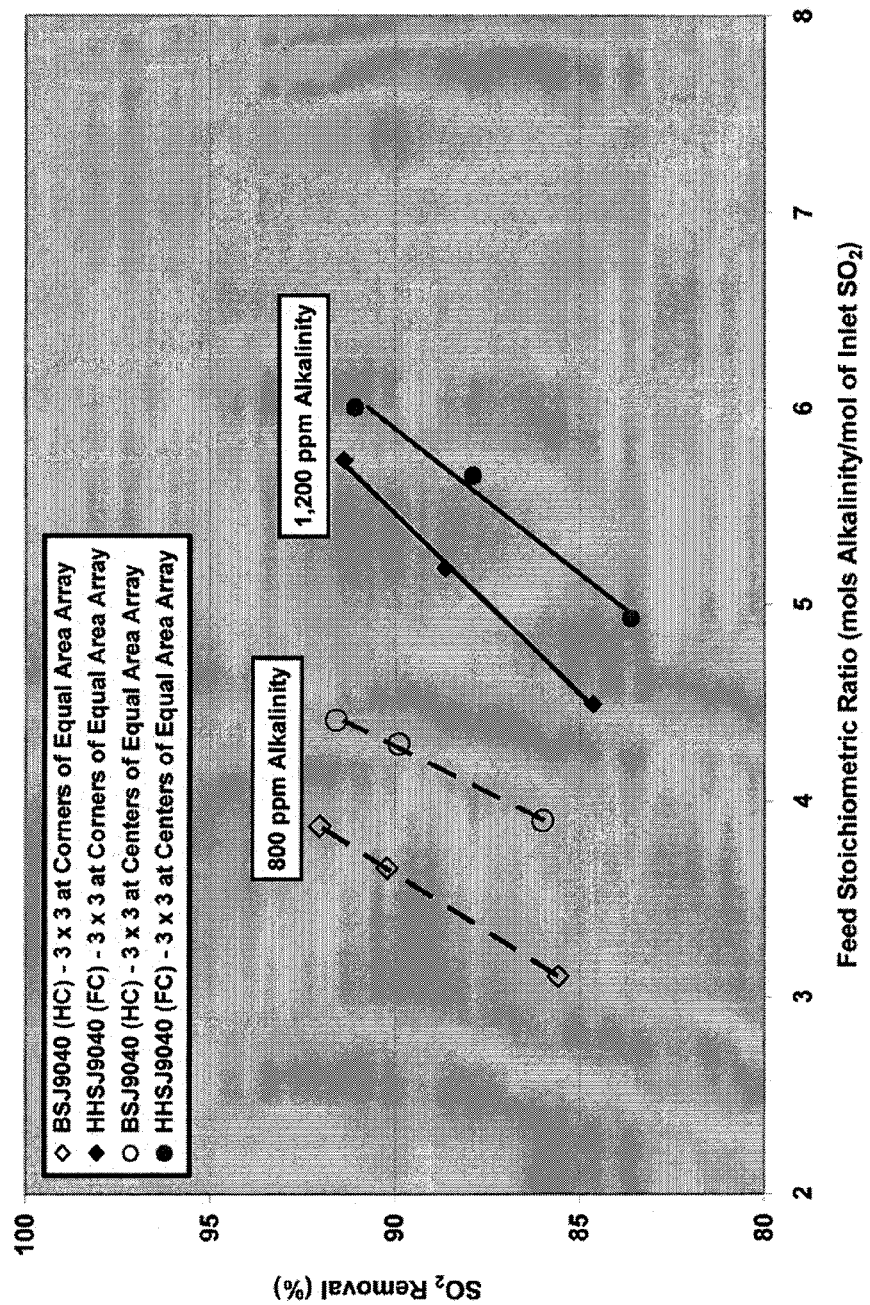
FIG. 9a is a graph illustrating sulfur dioxide removal as a function of alkalinity for the nozzle configurations of FIGS. 8a and 8b.
Figure 9B:
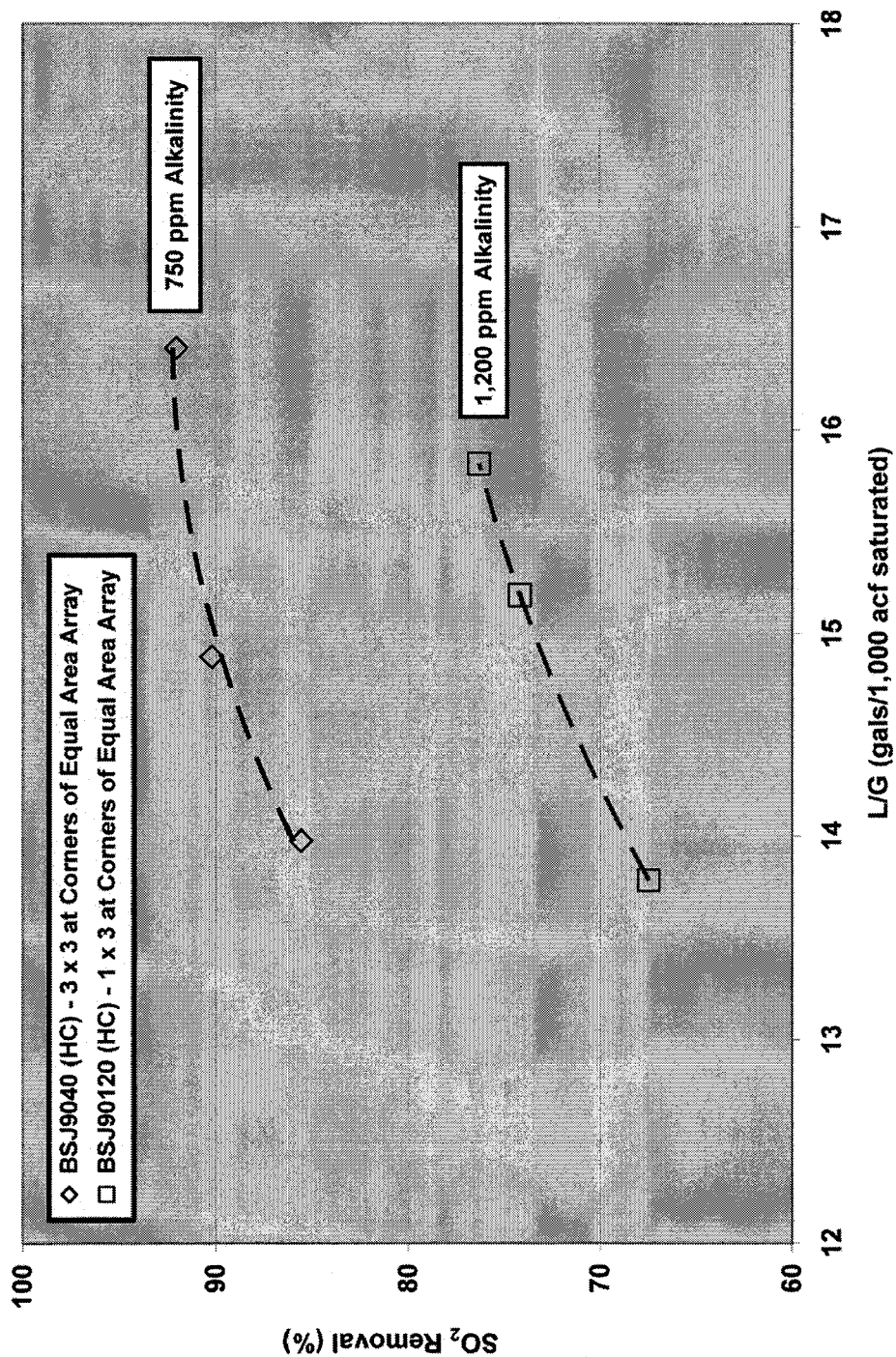
FIG. 9b is a graph illustrating sulfur dioxide removal as a function of L/G for the nozzle configurations of FIGS. 8b and 8c.

A horizontal gas-liquid scrubbing system similar to the one illustrated in FIG. 1 is produced. The housing has a width of 18.5" and a length of 29.75". A single bank of nozzles having a variety of nozzle arrangements are utilized. These nozzle array configurations are illustrated in FIGS. 8a-8c. A first array is configured as illustrated in FIG. 8a and includes a 3×3 array of BSJ9040 (hollow cone) nozzles. A second array is configured as illustrated in FIG. 8a and includes a 3×3 array of BSJ9040 (full cone) nozzles. A third array is configured as illustrated in FIG. 8b and includes a 3×3 array of BSJ9040 (hollow cone) nozzles. A fourth array is configured as illustrated in FIG. 8b and includes a 3×3 array of BSJ9040 (full cone) nozzles. A fifth array is configured as illustrated in FIG. 8c and includes a 3×1 array of BSJ90120 nozzles. An inlet gas comprising about 100 ppm SO$_2$, and a sodium-based alkaline scrubbing liquor are used. The L/G ratio is varied and the gas inlet velocity is about 22 fps. As illustrated in FIGS. 9a and 9b, the nozzle array configuration of FIG. 8b yields higher SO$_2$ removal efficiency than the nozzle array configuration of FIGS. 8a and 8c. Furthermore, the hollow cone nozzles realize superior performance than the full cone nozzles.

Example 5

Evaluation of Nozzle Types

Figure 10:
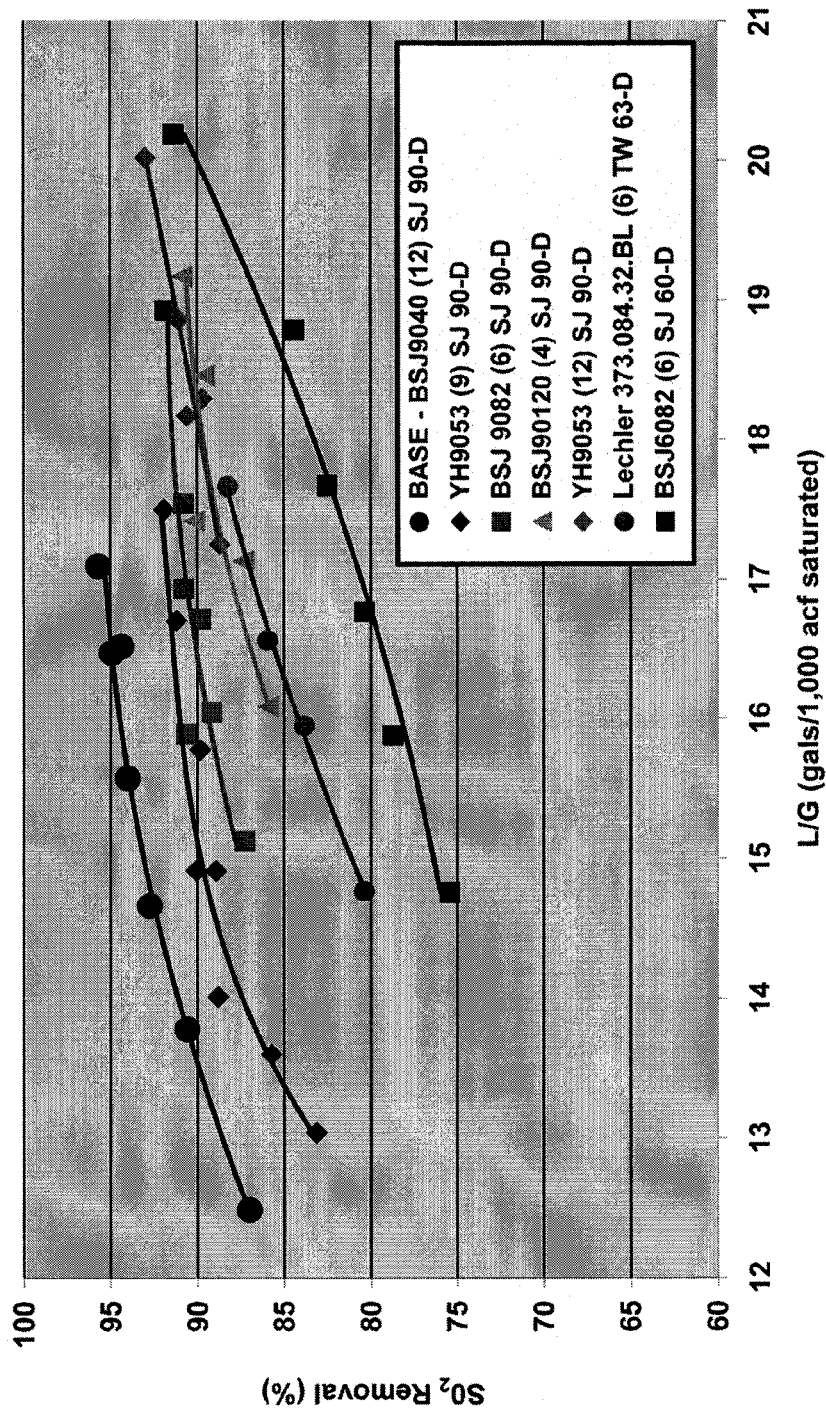
FIG. 10 is a graph illustrating sulfur dioxide removal as a function of L/G for a variety of nozzle types.

A horizontal gas-liquid scrubbing system similar to the one illustrated in FIG. 1 is produced. The housing has a width of 27.625" and a length of 27.625". An inlet gas comprising about 100 ppm SO$_2$, and a sodium-based alkaline scrubbing liquor are used. The L/G ratio is varied and the gas inlet velocity is about 22 fps. A variety of nozzles are used to test the SO$_2$ removal performance of the nozzles. Tested nozzles includes spiral jet nozzles, tangential jet nozzles and whirl jet nozzles. The spray angle is also varied in some nozzles (90° and 60°) as well as the cone type (hollow cone and full cone). As illustrated in FIG. 10, the spiral jet, 90°, hollow cone nozzles perform the best over the range of the varied L/G ratio.

Example 6

Evaluation of Various Inlet SO₂ Concentrations and Scrubbing Liquors

Figure 11:
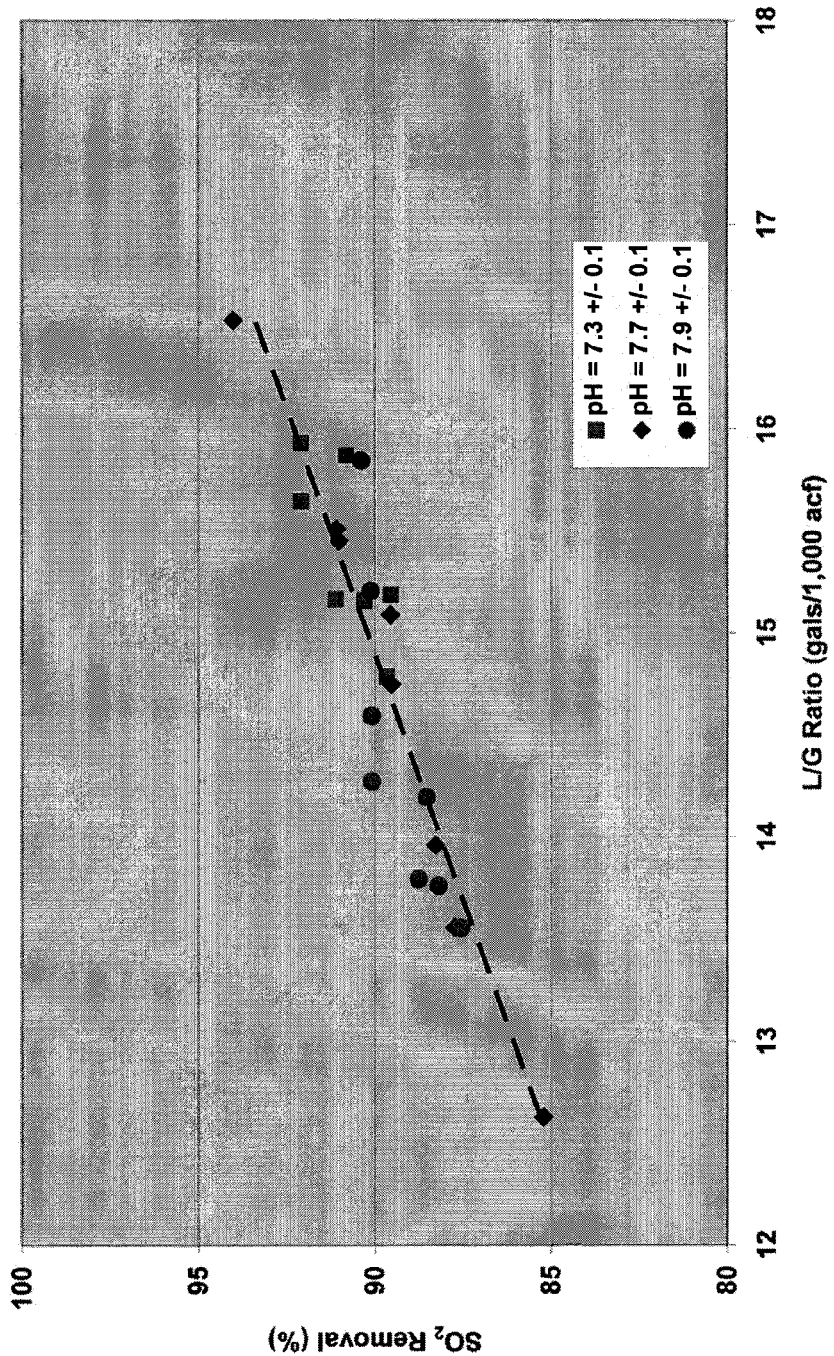
FIG. 11 is a graph illustrating sulfur dioxide removal as a function of L/G for a waste gas stream comprising 80 ppm $SO_2$.
Figure 12:
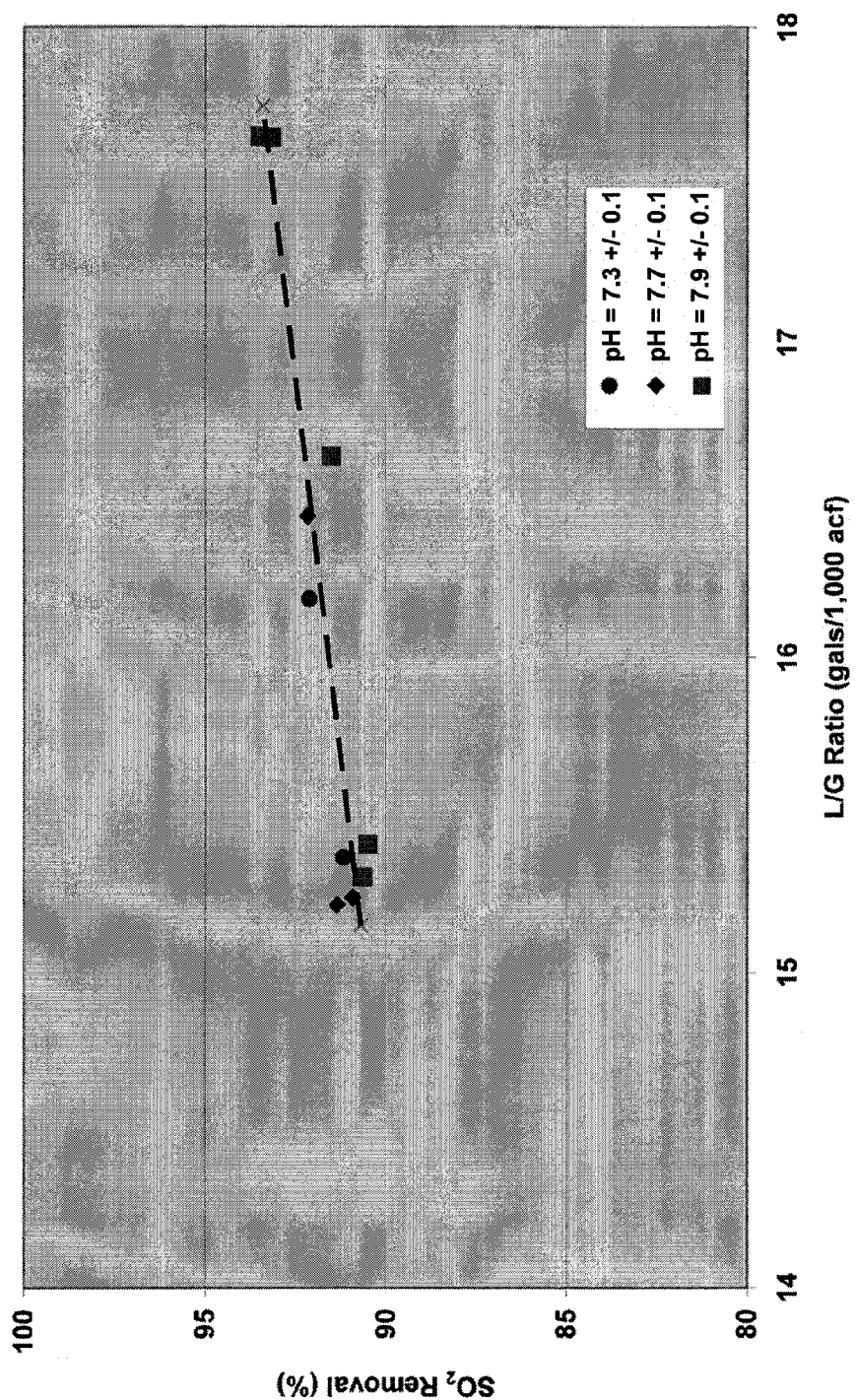
FIG. 12 is a graph illustrating sulfur dioxide removal as a function of L/G for a waste gas stream comprising 200 ppm $SO_2$.
Figure 13:
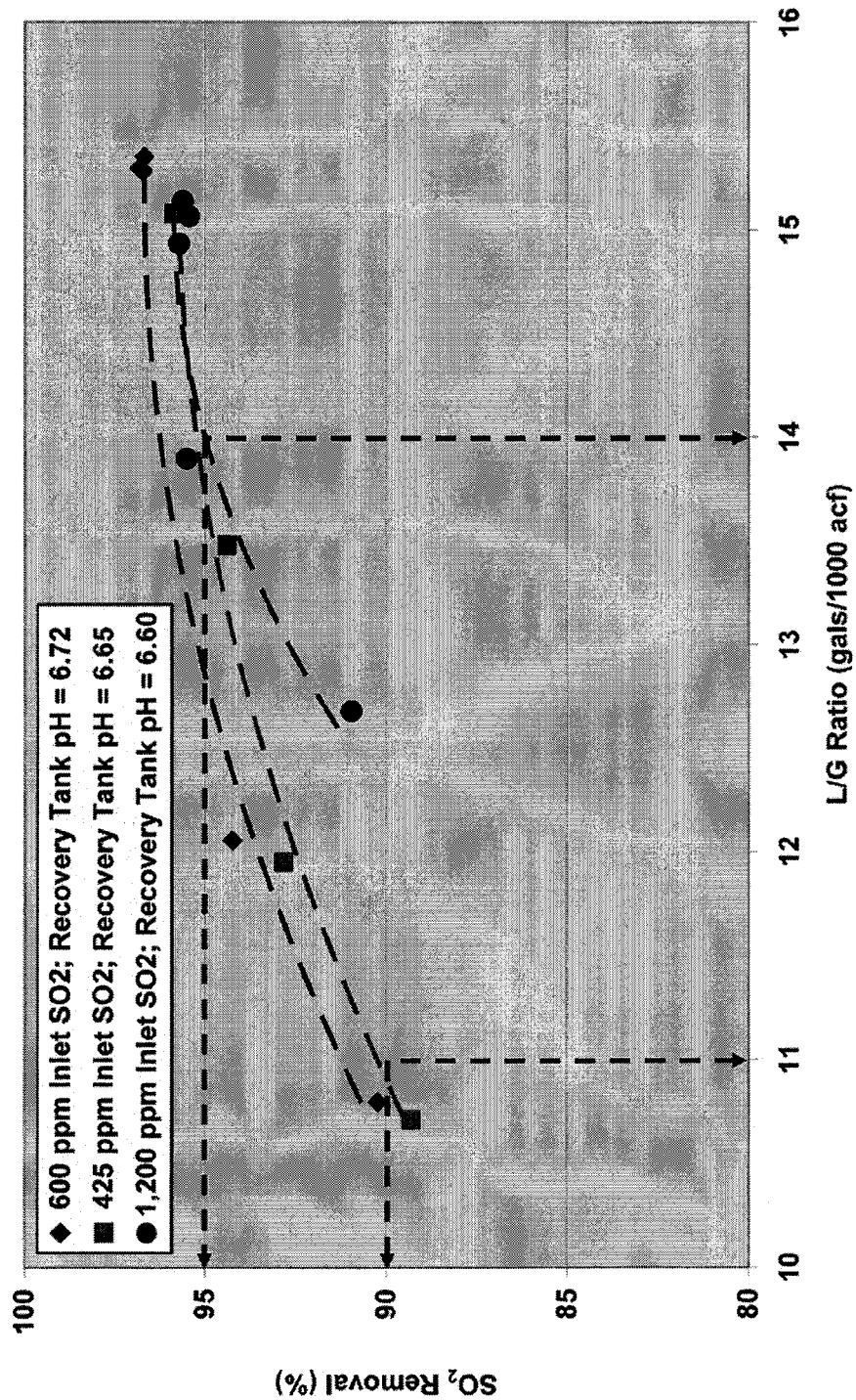
FIG. 13 is a graph illustrating sulfur dioxide removal as a function of L/G for waste gas streams comprising 425, 600, and 1200 ppm $SO_2$.

A horizontal gas-liquid scrubbing system similar to the one illustrated in FIG. 1 is produced. Various waste gas streams have a bulk gas velocity of about 22 feet per second and $SO_2$ concentrations of from about 80 ppm to about 1200 ppm are treated with the system and at an L/G range of from about 11 to about 18. Various scrubbing liquors are used to treat the waste gas streams. In particular, in the 80 ppm and 200 ppm tests, a dilute mode dual alkali approach is utilized, and in the 425 ppm, 600 ppm, and 1200 ppm tests, a concentrated mode dual alkali approach is utilized. The system consistently removes at least 85 vol. % $SO_2$, and often at least 90 vol. % $SO_2$, from the waste gases, and with an L/G of less than 18, and often less than 16. FIG. 11 illustrates the amount of sulfur dioxide removed as a function of L/G for a waste gas stream comprising 80 ppm $SO_2$. FIG. 12 illustrates the amount of sulfur dioxide removed as a function of L/G for a waste gas stream comprising 200 ppm $SO_2$. FIG. 13 illustrates the amount of sulfur dioxide removed as a function of L/G for waste gas streams comprising 425 ppm, 600 ppm, and 1200 ppm $SO_2$.

Example 7

Effect of Pre-Humidification of the Waste Gas Stream

Figure 14:
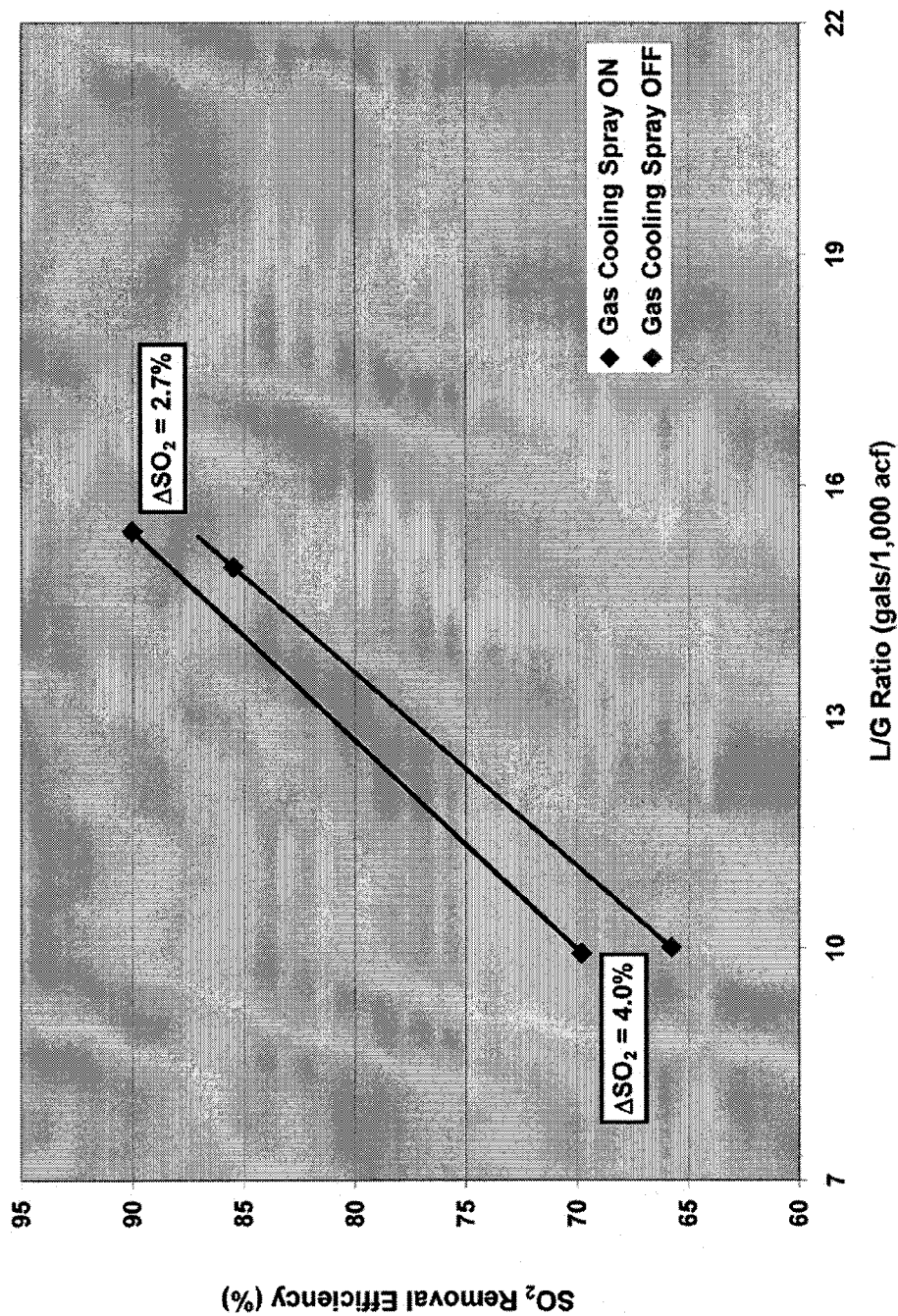
FIG. 14 is a graph illustrating sulfur dioxide removal as a function of L/G for waste gas streams with and without partial humidification of the inlet gas.

A horizontal gas-liquid scrubbing system similar to the one illustrated in FIG. 1 is produced. A waste gas stream having a bulk gas velocity of about 21 feet per second and an $SO_2$ concentration of about 80 ppm is treated with the system at an L/G range of from about 10 to about 16. In a first approach, the waste gas stream is treated without pre-humidifying the waste gas stream prior to treating the waste gas stream with the scrubbing liquor. In a second approach, the waste gas stream is pre-humidified prior to treating the waste gas stream with the scrubbing liquor. As illustrated in FIG. 14, the system removes from about 2.7 vol. % to about 4.0 vol. % more $SO_2$ using pre-humidification.

While the term "nozzles" has been used herein to describe one type of mist generation device, such term has been used merely for illustrative purposes, and it is expressly contemplated that other mist generation devices may be utilized to produce a mist within the housing of the horizontal gas-liquid scrubber, such as jets, ultrasonics and other devices. Furthermore, while various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A horizontal duct scrubbing system for removing gaseous pollutants from a gas, the horizontal duct scrubbing system comprising:
    (a) a horizontally disposed housing having a waste gas inlet for receiving a gas stream and a treated gas outlet for discharging the gas stream;
    (b) a liquid inlet manifold disposed within the horizontally disposed housing, the liquid inlet manifold comprising a plurality of nozzles oriented to spray a scrubbing liquor co-current to the flow of the gas stream;
        (i) wherein the plurality of nozzles of the liquid inlet manifold are configured to spray the scrubbing liquor at an average flow rate (L) of less than 20 gallons per minute per 1000 actual cubic feet per minute (ACFM) of water saturated gas stream flow exiting the treated gas outlet (G); and
        (ii) wherein each of the plurality of nozzle is configured to eject the scrubbing liquor at a pressure of at least about 40 psig and at a flow rate of not greater than about 50 gpm;
    (c) a demister located proximal the treated gas outlet, wherein the horizontally disposed housing is substantially free of flow deflection members between the liquid inlet manifold and the demister.

2. The system of claim 1, wherein the horizontal duct scrubbing system removes at least 90 vol. % sulfur dioxide from the gas stream.

3. The system of claim 2, wherein the horizontal duct scrubbing system removes at least 95 vol. % sulfur dioxide from the gas stream.

4. The system of claim 3, wherein the horizontal duct scrubbing system operates at an L/G ratio of not greater than about 18.

5. The system of claim 3, wherein the L/G ratio is not greater than about 14.

6. The system of claim 3, wherein the L/G ratio is not greater than about 12.

7. The system of claim 1, wherein the liquid inlet manifold comprises a plurality of lances for supplying the scrubbing liquor to the plurality of nozzles, wherein each of the lances comprises at least one of the plurality of nozzles.

8. The system of claim 1, wherein the liquid inlet manifold is a first liquid inlet manifold, and wherein the system further comprises:
    at least a second liquid inlet manifold disposed between the first liquid inlet manifold and the demister within the horizontally disposed housing, wherein the second liquid inlet manifold comprises a plurality of nozzles oriented to spray a scrubbing liquor co-current to the flow of the gas stream.

9. The system of claim 8, wherein the horizontal duct scrubbing system operates at an L/G ratio of less than 20 per liquid inlet manifold.

10. The system of claim 1, wherein the gas stream comprises at least one of NOx, HF, HCl, and $SO_3$, and the system removes at least some of the NOx, HF, HCl, and $SO_3$ from the gas stream.

11. A method for removing gaseous pollutants from a gas, the method comprising:
    (a) flowing a gas stream comprising gaseous pollutants into a horizontally disposed housing via a waste gas inlet, the horizontally disposed housing comprising the waste gas inlet at one end, a treated gas outlet at an opposite end, a liquid inlet manifold proximal the waste gas inlet and a demister proximal the treated gas outlet, wherein the horizontally disposed housing is substantially free of flow deflection members between the liquid inlet manifold and the demister, thereby defining a substantially unrestricted gas-liquid contacting zone between the liquid inlet manifold and the demister;
    (b) passing the gas stream through the substantially unrestricted gas-liquid contacting zone;
    (c) spraying, concomitant to the passing step, a scrubbing liquor through the substantially unrestricted gas-liquid contacting zone and co-current to the flow of the gas stream, thereby contacting the gas stream with the scrubbing liquor;

(i) wherein the spraying comprises ejecting the scrubbing liquor at a pressure of at least about 40 psig and at a flow rate of not greater than about 50 gpm;

(d) removing at least some of the gaseous pollutants from the gas stream during the contacting, wherein the gaseous pollutants comprise sulfur dioxide, and wherein, after the removing step, at least about 90 vol. % sulfur dioxide is removed from the gas stream; and (e) operating, during the flowing, passing, spraying and removing steps at an L/G ratio of less than 20;

wherein the sulfur dioxide concentration in the gas stream prior to the passing step is not greater than 2000 ppm.

12. The method of claim 11, wherein the L/G ratio is at least about 5.

13. The method of claim 12, wherein the L/G ratio is not greater than about 18.

14. The method of claim 11, wherein the gas stream comprises at least one of NOx, HF, HCl, and $SO_3$, and wherein the removing step comprises:

removing at least some of the NOx, HF, HCl, and $SO_3$ from the gas stream.

15. The method of claim 11, wherein during the passing step the gas stream has a speed of at least about 12 feet per second.

16. The method of claim 15, wherein during the passing step the gas stream has a speed of not greater than about 45 feet per second.

17. The method of claim 11, wherein, during the operating step, the pressure drop of the gas stream between the waste gas inlet and the treated gas outlet is not greater than 6 inches of water.

18. The method of claim 11, wherein, after the removing step, at least about 95 vol. % sulfur dioxide is removed from the gas stream.

19. The method of claim 18, wherein the L/G ratio is not greater than about 18.

20. The method of claim 18, wherein the L/G ratio is not greater than about 14.

21. The method of claim 18, wherein the L/G ratio is not greater than about 12.

22. The method of claim 11, comprising:

upstream of the liquid inlet manifold, at least partially humidifying the gas stream.

* * * * *